United States Patent [19]

Kikuga et al.

[11] 4,115,327

[45] Sep. 19, 1978

[54] PHENOLIC RESIN COLOR DEVELOPING COMPOSITIONS FOR COPYING PAPERS AND METHODS OF PREPARATION

[75] Inventors: Toyoji Kikuga; Koji Hirai, both of Fujieda, Japan

[73] Assignee: Sumitomo Durez Company, Ltd., Tokyo, Japan

[21] Appl. No.: 808,581

[22] Filed: Jun. 21, 1977

Related U.S. Application Data

[63] Continuation of Ser. No. 654,243, Jan. 2, 1976, abandoned.

[30] Foreign Application Priority Data

Feb. 13, 1975 [JP] Japan .................................. 50-17513

[51] Int. Cl.$^2$ .............................................. C08L 3/02
[52] U.S. Cl. ................................ 260/17.2; 252/62.1 L; 260/29.3; 428/323; 428/341; 428/411
[58] Field of Search .................. 260/17.2, 29.3, 57 C, 260/59 R; 252/62.1 L; 428/411, 323, 341

[56] References Cited

U.S. PATENT DOCUMENTS

| | | | |
|---|---|---|---|
| 2,069,178 | 1/1937 | Dent et al. ........................... | 260/29.3 |
| 2,443,893 | 6/1948 | Collins ................................ | 260/17 R |
| 3,459,128 | 8/1969 | Erdmann et al. .................... | 260/29.3 |
| 3,663,483 | 5/1972 | Steel ..................................... | 260/17.2 |
| 3,743,619 | 7/1973 | Kooguchi et al. ..................... | 260/59 |
| 3,891,580 | 6/1975 | Morris et al. ......................... | 260/17.2 |
| 3,952,132 | 4/1976 | Kato et al. ............................ | 428/411 |

*Primary Examiner*—Edward M. Woodberry
*Attorney, Agent, or Firm*—Peter F. Casella; James F. Mudd; William G. Gosz

[57] ABSTRACT

Improved aqueous color developing compositions for copying papers are prepared by emulsifying phenolic resins having relatively low molecular weights. The aqueous emulsions are prepared by condensing a phenol and an aldehyde in the presence of an acid catalyst, and without the customary steps of high temperature concentration or dry pulverization of the solid resin the precondensate is directly emulsified with starch or other emulsifiers while in a liquid state. Uniformity of resin particle size is achieved by accelerated agitation of the precondensate. The process provides stable emulsions with fine resin particles having a diameter of under about 7 microns, which excel in color developing properties, fastness to light and have extended shelf life.

11 Claims, No Drawings

PHENOLIC RESIN COLOR DEVELOPING COMPOSITIONS FOR COPYING PAPERS AND METHODS OF PREPARATION

This is a continuation, of application Ser. No. 654,243, filed Jan. 2, 1976 and now abandoned

BACKGROUND OF THE INVENTION

This invention relates generally to improved aqueous emulsions of phenolic resins for use as color developing agents for pressure-sensitive and heat-sensitive copying papers and improved methods for their manufacture.

In the process of preparing phenolic resins for color developing agents, the usual procedure, heretofore, comprised the steps of reacting a phenol with an aldehyde in the presence of an acidic catalyst to produce a precondensate, subsequently heating to concentrate the precondensate at elevated temperatures of from 130° C. to 200° C., thereafter cooling the concentrated precondensate to obtain solid lumps of the phenolic resin. The solidified resin was then mechanically pulverized, first by means of a dry pulverizer into finely divided particles, mixing the resultant fine particles with water, a dispersing agent, surfactant and other additives, followed with treating the mixture to wet pulverization, such as in a colloid mill, sand grinding mill or attriter to obtain an emulsion.

As a modification of this earlier procedure, the resin would be dissolved in an organic solvent wherein the solution was then converted into an oil-in-water emulsion.

However, various problems arose when the precondensate was heated, namely increased molecular weight, lowered solubility in dye solutions, impaired color-developing properties (speed in color development and density of color) and degraded fastness to light, which rendered such earlier methods less than satisfactory.

In addition to the above shortcomings, the step of subjecting the phenolic resin to dry pulverization was time consuming and polluted the working environment raising the possibility of dust explosion.

It has now been discovered that superior emulsions with excellent color developing properties and fastness to light may be prepared with phenolic resin particles having a fine, uniform diameter and relatively low molecular weight distributed within a narrow range. In addition, an improved method for preparing such phenolic resins for color developing emulsions has been discovered which eliminates the need for the steps of high temperature concentration and dry pulverization.

Accordingly, it is the principal object of the present invention to provide improved color developing emulsions for copying papers that have superior color developing properties, fastness to light and extended shelf life.

It is a further object of the present invention to provide improved processes for preparing phenolic resins for color developing emulsions by an in-situ type method.

A still further object of the instant invention is to provide improved methods for preparing non-toxic, non-flammable aqueous phenolic resin-containing color developing emulsions through the elimination of elevated temperature concentrating and dry pulverization.

These and other objects, features and advantages will become apparent to those skilled in the art after a reading of the following more detailed description.

PREFERRED EMBODIMENTS OF THE INVENTION

The present invention relates to phenolic resin-containing color developing emulsions and improved methods for their manufacture.

Generally, an aqueous emulsion of phenolic resin is prepared by the steps of reacting a phenol with an aldehyde in the presence of a catalyst to produce a precondensate of phenolic resin, adding starch alone or in combination with one or more surface active agents to the precondensate while under agitation to give rise to an emulsion, and gradually adding the emulsified precondensate to a wet pulverizer containing an aqueous solution of a material selected from the group consisting of protective colloids, anionic and nonionic surface active agents.

More specifically, an aldehyde and at least one phenol in a molar ratio of 0.5 to 1.3, with water or an organic solvent, such as benzene, toluene, xylene, cyclohexane, trichloroethylene, etc., with or without agitation are subjected to a condensation reaction in the presence of an acidic catalyst to provide a novolac type resin having an average of from 2 to 6 phenolic nuclei per molecule. Starch is added either alone or in conjunction with anionic surface active agents to the precondensate with accelerated agitation (if conditions require, after the solvent and water have been distilled under normal pressure or reduced pressure at a temperature of not more than 110° C.) to produce an aqueous emulsion of phenolic resin. Further, for the purpose of improving the effect of agitation or adjusting the diameter of particles in the emulsion to under about 7 microns, the aqueous emulsions may be prepared by treatment with wet pulverizing means, by use of a fret mill, sand grinding mill or attriter, etc. The final emulsion should have a solids content range of phenolic resin from about 20 to 80% by weight, and more preferably from about 30 to 60%.

The immediate foregoing process also contemplates a modified procedure as a result of the condensation reaction wherein the solvent system is neutralized with an alkaline substance such as triethanolamine, caustic soda, calcium hydroxide, barium hydroxide, etc., before it is emulsified.

As a further embodiment the instant invention provides for condensing one or more phenols and an aldehyde for conversion to a resol in the presence of an alkaline catalyst such as sodium hydroxide, potassium hydroxide, calcium or barium hydroxides, etc., followed by neutralization of the resol with an acid, such as sulfuric, phosphoric or hydrochloric acids and the like, to a pH ranging from 4 to 6, followed by a condensation reaction to produce a novolac with or without added acid catalyst. The diameter of the resin particles in the emulsion may be modified by processing in a wet pulverizer according to the methods stated herein above.

The resin particles of the aqueous emulsions, according to the present invention, should have a diameter of about 1 to 7 microns, and more preferably not more than 3 or 4 microns. If the particle diameter is larger than 7 microns, the emulsions have poor stability, exhibit inferior color developing properties making it necessary to increase the amount of phenolic resin used in the emulsion.

For purposes of the present invention the resins may be prepared with a broad range of phenols such as, for example, phenol, o-cresol, m-cresol, p-cresol, p-ethyl phenol, p-tertiary-butyl phenol, isobutyl phenol, isopropyl phenol, p-octyl phenol, p-dodecyl phenol, p-nonyl phenol, p-phenylphenol, p-bromophenol, o-chlorophenol, p-chlorophenol, p-cumylphenol, $\alpha$-naphthol, $\beta$-naphthol, and the like. Phenols may be used singly or in a combination of two or more.

The aldehydes reactant used in preparing the phenolic resins may consist of formaldehyde (formalin, paraform), acetaldehyde, butyraldehyde, etc.

One or more acid catalysts used in preparing the novolac resins for the color developing emulsions disclosed herein include those generally referred to as inorganic acids and organic acids, such as hydrochloric, sulfuric, phosphoric, oxalic, acetic, formic, p-toluensulfonic, benzensulfonic, phenolsulfonic, napthylenesulfonic, and the like. Such acids are used in the reaction mixture in an amount ranging from 0.05 to 5.0 percent by weight of total phenols used. Wherever parts — and percents — are mentioned herein, they are intended to mean — parts by weight — and — percents by weight — unless otherwise specified.

Appropriate starches include any commonly available commercial varieties of starch or derivatives thereof and may be employed either alone or in combination with surfactants, and more preferably, an anionic type surface active agents. Surface active agents employed in the emulsions include a wide range of materials, such as, for example alkyl benzene sulfonate, mono and dialkyl phosphates, sulfated fatty alcohols, esters of sulfosuccinic acid. Surfactants falling within these foregoing groups are typically the $C_9$ to $C_{15}$-alkyl-benzene sulfonates like decyl and dodecyl benzene sulfonates, diisobutyl napthalene sulfonate and their respective salts. Other examples falling with the purview of the above groups are sodium lauryl sulfate, sodium tetradecyl sulfate, sodium pentadecyl sulfate, sodium octyl sulfate, mono and dilauryl phosphates, di(2-ethylhexyl) phosphate. Esters of sulfo succinic acid are available under such trademarks as "Aerosol OT" (sodium dioctyl ester) and "Monowet MO-70-E" (sodium diosobutyl ester). Numerous other succinic ester like di-tridecyl sodium and di-hexyl sodium are also adaptable to the subject — process disclosed herein and are available through ordinary channels of commerce.

In addition to the foregoing group of surface active agents, others may include ethylene oxide, polyhydric alcohol, glyceride, alkylamide types and similar other types of nonionic surface active agents. The surfactants mentioned herein may be used singly or in combination with one another, however, anionic surfactants have been found to be preferable and particularly the carboxylic acid type.

In addition to the starches and surface active agents disclosed herein above, protective colloid substances may be incorporated into the precondensate for purposes of enhancing dispersability of the resin. Such materials may include polyvinyl alcohols, polyacrylamides, hydroxyethyl cellulose, methyl cellulose, carboxymethyl cellulose, gum arabic, gelatin, sodium algenate, casein, polyvinyl pyrrolidone, styrene-maleic anhydride copolymers and polyacrylic acid.

It should be noted that excessive quantities of starch, protective colloidal materials or surfactants used in the precondensate mixture may have a serious effect on the color developing properties of the emulsion. Therefore, to preclude such adverse effects, the foregoing materials should be incorporated in a combined amount of from 1 to 10% and preferably from 1 to 5% by weight based on the phenolic resin.

According to the present invention, accelerated agitation of the precondensate will provide an emulsion in which the suspended particles generally have a diameter in the range of from 1 to about 7 microns. Although such emulsions produced thereby have suspended resin particles that are fine enough for the emulsion to be satisfactorily used in an unmodified form for copying papers, it is more desirable that such emulsions be further treated for additional particle size reduction by means, for example, in a wet pulverizer, for a short period of time. The emulsion can be efficiently treated by gradually adding directly to the wet pulverizer.

The following specific examples demonstrate the processes and products of the instant invention, however, it is to be understood that these examples are for illustrative purposes only and do not purport to be wholly definitive as to conditions and scope.

EXAMPLE I

A reaction kettle was charged with 200 parts of p-phenylphenol, 70 parts of 37% formalin, 10 parts of concentrated hydrochloric acid (35.5%), 1 part of oxalic acid and 10 parts of water. The charge was reacted under reflux for 10 hours. Thereafter, to the reaction product which was kept under continued agitation, 200 parts of aqueous 2% carboxymethyl cellulose solution at room temperature was added. Further, 2 parts of a carboxylic acid-type anionic surface active agent (commercially available under the trademark "Orotan 731") was added thereto. Consequently a white emulsion was obtained. This emulsion was found to have a concentration of 41% and containing resin particles 1 to 7 microns in diameter.

EXAMPLE II

A reaction kettle was charged with 200 parts of parachlorophenol, 40 parts of 80% parts of xylene. The charge was reacted under reflux for five hours. Thereafter the reaction product was thoroughly agitated with 130 parts of water added thereto and subsequently distilled under reduced pressure to expel 180 parts of water or solvent. Then, the reaction product was agitated at an accelerated rate with 100 parts of aqueous 3% starch solution and 100 parts of aqueous 3% methyl cellulose solution both added thereto at a temperature of 35° C. Further, 10 parts of a carboxylic acid-type anionic surface active agent (commercially available as "Demole P") having a solids content of 20%. Consequently, a white emulsion was obtained which was found to have a concentration of 41% and contain resin particles 1 to 6 microns in diameter.

EXAMPLE III

A reaction kettle was charged with 200 parts of p-tertiary butyl phenol, 20 parts of phenol, 90 parts of 37% formalin and 2 parts of aqueous 10% caustic soda solution. The charge was reacted under reflux for two hours to produce resol and thereafter reacted with 0.35 part of concentrated sulfuric acid under reflux to convert it into a novolak. Subsequently, the reaction product was agitated at an accelerated rate with 180 parts of aqueous 2% carboxymethyl cellulose solution heated to 50° C added thereto. Further, 6 parts of a carboxylic acid-type anionic surface active agent (commercially available as "Monogen P") was added and a white emulsion which was found to have a concentration of 42% and contain resin particles 1 to 6 microns in diameter was obtained.

EXAMPLE IV

A reaction kettle was charged with 100 parts of p-chlorophenol, 100 parts of p-tertiary butyl phenol, 95 parts of 37% formalin, 10 parts of concentrated hydrochloric acid (35.5%), 1 parts of oxalic acid and 50 parts of water. The charge was reacted under reflux for eight hours and thereafter agitated at an accelerated rate with 90 parts of aqueous 2% hydroxyethyl cellulose solution and 90 parts of aqueous 2% carboxymethyl cellulose solution both heated to 60° C. added thereto, whereupon a white emulsion was obtained. This emulsion was found to have a concentration of 40% and contain resin particles 1 to 6 microns in diameter.

EXAMPLE V

A reaction kettle was charged with 200 parts of p-phenylphenol, 70 parts of 37% formalin, 10 parts of concentrated hydrochloric acid (35.5%), 1 part of oxalic acid and 40 parts of water. The charge was caused to react under reflux and thereafter agitated at an accelerated rate with 200 parts of an aqueous 1% carboxymethyl cellulose solution. Further 2 parts of a carboxylic acid-type anionic surface active agent (commercially available as "orotan 731") was added thereto, changing it into a white emulsion, which was found to contain resin particles 1 to 7 microns in diameter. The emulsion was treated in an attriter (wet pulverizer) for 30 minutes. The resultant emulsion was found to have a concentration of 42% and contain resin particles 1 to 3 microns in diameter.

EXAMPLE VI

A reaction kettle was charged with 200 parts of p-tertiary butyl phenol, 130 parts of 37% formalin, 10 parts of concentrated hydrochloric acid (35.5%), 1 part of oxalic acid and 50 parts of water. The charge was reacted under reflux for eight hours and thereafter agitated at an accelerated rate with 90 parts of aqueous 4% hydroxyethyl cellulose solution and 90 parts of aqueous 4% carboxymethyl cellulose solution both added thereto at an elevated temperature of 40° C. Further, 2.5 parts of a carboxylic acid-type anionic surface active agent (commercially available as "Orotan 731") was added thereto, which gave a white emulsion. This emulsion was found to have a concentration of 39% and contain resin particles 1 to 7 microns in diameter.

EXAMPLE VII

A mixed liquid was prepared by treating 150 parts of water and 50 parts of a carboxylic acid-type anionic surface active agent (commercially available as "Demole P") having a solids content of 20% in an attriter (wet pulverizer). Into the attriter which was kept in continued operation, the phenolic resin precondensate obtained by the procedure of Example I (held at 90° C) was introduced dropwise over a period of 30 minutes. After that, the wet pulverization was continued for one hour to produce a white emulsion. This emulsion was found to have a concentration of 42% and contain resin particles 1 to 3 microns in diameter.

EXAMPLE VIII

A mixed liquid was prepared by treating 30 parts of water, 150 parts of an aqueous 2% carboxymethyl cellulose solution, 20 parts of a carboxylic acid-type anionic surface active agent (commercially available as "Demole P") having a solid content of 20% and 1 part of a polyether-type nonionic surface active agent (commercially available as "Prolonick L-62"). Subsequently, the precondensate obtained by the procedure of Example I was introduced dropwise (at a temperature of 80° C.) into the attriter which was kept in continued operation, over a period of 30 minutes. After that, the wet pulverization was continued for one hour to produce a white emulsion. This emulsion was found to have a concentration of 40% and contain resin particles 1 to 3 microns in diameter.

COMPARATIVE EXAMPLE I

A reaction kettle was charged with 200 parts of p-phenylphenol, 70 parts of 37% formalin, 10 parts of concentrated hydrochloric acid (35.5%), 1 part of oxalic acid and 10 parts of water. The charge was reacted under reflux for ten hours and thereafter, dehydrated and further concentrated. The reaction product was removed from the kettle while the inner temperature was 180° C. The resin thus obtained had a yellowish brown color. This resin was subjected to dry pulverization. In an attriter (wet pulverizer), 200 parts of the powdered resin was treated with 90 parts of water, 200 parts of 2% carboxymethyl cellulose and 2 parts of a carboxylic acid-type anionic surface active agent (commercially available as "Orotan 731") until the particle diameter distribution fell in a range of 1 to 3 microns. The treatment required 5 hours. The emulsion thus obtained was found to have a concentration of 41% and a grayish brown appearance.

COMPARATIVE EXAMPLE II

A reaction kettle was charged with 200 parts of p-chlorophenol, 40 parts of 80% para-formaldehyde, 1 part of para-toluenesulfonic acid and 80 parts of xylene. The charge was reacted under reflux for five hours. Thereafter, the reaction product was freed of water and solvent and further concentrated. It was then removed from the kettle while the inner temperature was 180° C. The resin thus obtained had a brown color. The resin was subjected to dry pulverization. In an attriter (wet pulverizer), 200 parts of the powdered resin, 90 parts of water, 100 parts of aqueous 3% starch solution, 100 parts of 3% methyl cellulose solution and 10 parts of an anionic surface active agent (commercially available as "Demole P") were treated until the particle diameter distributor fell in a range of 1 to 3 microns. The treatment required 5 hours. The emulsion thus obtained was found to have a concentration of 41% and a grayish brown appearance.

COMPARATIVE EXAMPLE III

A reaction kettle was charged with 200 parts of p-tertiary-butyl phenol, 130 parts of 37% formalin, 10 parts of concentrated hydrochloric acid (35.5%), 1 part of oxalic acid and 50 parts of water. The charge was reacted under reflux for eight hours and subsequently dehydrated and further concentrated. The resultant reaction product was removed while the inner temperature was 200° C. The product was pulverized in a dry pulverizer. In an attriter (wet pulverizer), 200 parts of the powdered resin was treated with 130 parts of water, 90 parts of aqueous 4% hydroxyethyl cellulose solution, 90 parts of aqueous 4% carboxymethyl cellulose solution and 2.5 parts of carboxylic acid-type anionic surface active agent (commercially available as "Orotan 731") until the particle diameter distribution fell in a range of 1 to 3 microns. The treatment required five hours. The resultant emulsion was found to have a concentration of 41% and a grayish brown appearance.

COMPARATIVE EXAMPLE IV

In an attriter (wet pulverizer), 200 parts of bis-phenol A, 130 parts of water, 90 parts of an aqueous 4% hydroxyethyl cellulose solution, 90 parts of an aqueous 4% carboxymethyl cellulose solution and 2.5 parts of a carboxylic acid-type anionic surface active agent ("Orotan" 731) were treated until the particle diameter distribution of resin particles fell in a range of 1 to 3 microns. The treatment required 3 hours 30 minutes. The emulsion thus obtained was found to have a concentration of 41% and a white appearance.

Properties of the products obtained in Examples I, II, III, IV, V, VII, and VIII and Comparative Examples I and II were tested for their use in pressure-sensitive copying papers. The test results were as shown in Table 1.

Table 1

Test results in pressure-sensitive copying papers

| Item Example No. Comparative Example No. | Color-developing properties | | Fastness to light | Shelf life (in months) |
|---|---|---|---|---|
| | Velocity | Density | | |
| Example I | +++ | o | O | 3 |
| Comparative Example I | ++ | o | Δ | 1 |
| Example II | ++ | o | Δ | 3 |
| Comparative Example II | + | o | X | 1 |
| Example III | ++ | o | Δ | 3 |
| Example IV | ++ | o | O | 3 |
| Example V | +++ | | O | 4 |
| Example VII | +++ | | O | 2 |
| Example VIII | +++ | | O | 4 |

Test method: A coating solution was prepared by wet pulverizing 100 parts of water, 100 parts of calcium carbonate and 2 parts of gum arabic and subsequently admixing therewith 10 parts of a given emulsion of phenolic resin. The coating solution was applied to a substrate paper at a rate of 3 g/m², dried by left standing at room temperature for one day and put to test.

(1) Color-developing properties: A paper having deposited thereon a colorless dye were placed face to face on top of the other paper obtained as described above and a predetermined amount of pressure was applied upon the papers for color development. After intervals of 60 seconds and 24 hours, color development of the paper was tested with the aid of a Hunter's color-difference meter, with the speed of color development and the density of color rated respectively on the following scales.

Speed — +++ Very high, ++ high, + ordinary
  Density — o High, o ordinary (2) Fastness to light: The paper mentioned above was exposed to sunlight for two weeks and, at the end of exposure, tested for degree of discoloration by visual inspection and by means of a Hunter's color-difference meter. The degree was expressed as follows:

o Good, Δ poor, x very poor (3) Shelf life: A fixed amount of a given emulsion of phenolic resin was placed in a 2-liter tall horn breaker and left to stand at room temperature. Shelf life was rated in terms of the length of time in standing required for appearance of a sign of sediment.

The aqueous emulsion of phenolic resin according to the present invention proved to excel in color-developing properties, fastness to light and shelf life.

Properties of the products of Examples 6 and 8 and Comparative Examples 3 and 4 were tested for their use in heat-sensitive copying papers. The test results were as shown in Table 2.

Table 2

Test results in heat-sensitive copying papers

| Item Example No. Comparative Example No. | Heat-sensitive color-developing | | Dye-mixing property | Fastness to light | Shelf life (months) |
|---|---|---|---|---|---|
| | 100° C | 140° C | | | |
| Example VI | o | | o | o | 2 |
| Example VIII | o | | o | o | 4 |
| Comparative Example III | Δ | o | o | Δ | 1 |
| Comparative Example IV | X | o | | | 1 |

Test method: A dye solution was obtained by wet pulverizing 10 parts of crystal violet lactone, 5 parts of polyvinyl alcohol and 85 parts of water in an attriter.

A mixture of 10 parts of said dye solution with 10 parts of the emulsion of a phenolic resin or of bis-phenol A and 90 parts of water was applied to a paper at a rate of 5 g/m², left to stand at room temperature for one day and then put to test.

(1) Heat-sensitive color-developing property — Halves of each coated paper were heated at two levels each for one minute. At the end of heat treatment, the papers were tested for degree of color development with the aid of Hunter's color-difference meter. The degree was rated as follows: o Deep color development, o medium color development, Δ light color development, x no color development.

(2) Dye-mixing property — When 10 parts of said dye solution was mixed with 10 parts of an emulsion of phenolic resin (or an emulsion of bis-phenol A) and 90 parts of water, the degree of dye coloration was rated by visual inspection as follows: o Good with no coloration, o sligh coloration, x poor dye-mixing property because of coloration.

(3) Fastness to light — Said coated paper was exposed to sunlight for two weeks and tested for degree of discoloration by observation with unaided eyes and by means of a Hunter's color-difference meter. The degree was rated on the following scale: o very good, o Good, Δ poor.

(4) Shelf life: A fixed amount of a given emulsion of phenolic resin was placed in a 2-liter tall horn beaker and left to stand at normal room temperature. The shelf life was rated in terms of the length of the standing before appearance of the first sign of sediment.

Thus, the aqueous emulsion of phenolic resin according to the present invention was proved to excel in color-developing properties at low temperatures, fastness to light and shelf life.

While the invention has been described in conjunction with specific examples thereof, this is illustrative only. Accordingly, many alternatives, modifications and variations will be apparent to those skilled in the art in light of the foregoing description and it is therefore intended to embrace all such alternatives, modifications and variations as to fall within the spirit and broad scope of the appended claims.

We claim:

1. A method of preparing color developing emulsion compositions for copying papers without dry pulverization consisting essentially of:
   (a) condensing a reaction mixture consisting essentially of an aldehyde and at least one phenol to provide a phenolaldehyde novolac precondensate having an average of from 2 to 6 phenolic nuclei per molecule,
   (b) with agitation means directly emulsifying the resin precondensate of (a) while in a liquid state with the addition of from 1 to 10% by weight of an emulsifier to provide resin particles having a diameter of under about 7 microns, and
   (c) adjusting the size of the emulsified particles by treatment of the emulsion with wet pulverizing means; said emulsion composition having a solids content range of phenolic resin from about 20 to about 80 percent by weight.

2. The method of claim 1 wherein the condensation reaction is conducted in the presence of an acid catalyst.

3. The method of claim 1 wherein the phenol and aldehyde are converted to a resole in the presence of an alkaline catalyst, neutralized with an acid and condensed to provide a novolac-type resin.

4. The method of claim 1 wherein the emulsifying agent is starch.

5. The method of claim 1 wherein the emulsifying agent is a surfactant selected from the group consisting of anionic and non-ionic surface active agents.

6. The method of claim 1 wherein the emulsifying agent is a protective colloid.

7. The product made according to the method of claim 1.

8. The product made according to the method of claim 2.

9. The product made according to the method of claim 3.

10. The product made according to the method of clam 4.

11. The method of claim 1 wherein the emulsifier is a material selected from the goup consisting of starch, surfactant, protective colloid and mixtures thereof.

* * * * *